(12) United States Patent
Matsusue

(10) Patent No.: US 10,975,518 B2
(45) Date of Patent: *Apr. 13, 2021

(54) CELLULOSE MICROFIBERS AND METHOD FOR MANUFACTURING THE SAME

(71) Applicant: Daio Paper Corporation, Ehime (JP)

(72) Inventor: Ikko Matsusue, Ehime (JP)

(73) Assignee: Daio Paper Corporation, Ehime (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/485,713

(22) PCT Filed: Feb. 23, 2018

(86) PCT No.: PCT/JP2018/006617
§ 371 (c)(1),
(2) Date: Aug. 13, 2019

(87) PCT Pub. No.: WO2018/159473
PCT Pub. Date: Sep. 7, 2018

(65) Prior Publication Data
US 2019/0382948 A1    Dec. 19, 2019

(30) Foreign Application Priority Data
Feb. 28, 2017 (JP) .............................. JP2017-035663

(51) Int. Cl.
*D06M 11/70* (2006.01)
*D06M 13/432* (2006.01)
*D21H 11/20* (2006.01)
*D06M 101/06* (2006.01)

(52) U.S. Cl.
CPC .......... *D06M 11/70* (2013.01); *D06M 13/432* (2013.01); *D21H 11/20* (2013.01); *D06M 2101/06* (2013.01); *D06M 2400/01* (2013.01)

(58) Field of Classification Search
None
See application file for complete search history.

(56) References Cited

U.S. PATENT DOCUMENTS

| | | | | |
|---|---|---|---|---|
| 2005/0054848 A1* | 3/2005 | Valta | ....................... | C08B 15/06 536/32 |
| 2009/0305033 A1* | 12/2009 | Yano | ....................... | D21H 21/26 428/339 |
| 2015/0122430 A1* | 5/2015 | Kishida | ................... | D21H 11/18 162/14 |
| 2016/0115249 A1* | 4/2016 | Noguchi | ................... | C08B 5/00 536/62 |
| 2019/0169314 A1* | 6/2019 | Yoshida | ................... | C08L 7/00 |

FOREIGN PATENT DOCUMENTS

| | | |
|---|---|---|
| CA | 2976452 | 8/2016 |
| JP | 46-10551 | 3/1971 |
| JP | 2009-293167 | 12/2009 |
| JP | 2013-127141 | 6/2013 |
| JP | 2015-098526 | 5/2015 |
| JP | 2015-189698 | 11/2015 |
| JP | 2017-2231 | 1/2017 |
| JP | 2017-31548 | 2/2017 |
| JP | 2017-066272 | 4/2017 |
| WO | 2012/119229 | 9/2012 |
| WO | 2014/185505 | 11/2014 |
| WO | 2014185505 | 11/2014 |
| WO | 2017170908 | 4/2018 |

OTHER PUBLICATIONS

International Search Report, PCT/JP2018/006617, dated May 22, 2019.
Certificate of experimental results by Etsuko Hinohara, dated Mar. 15, 2019.
Costes et al., "Cellulose/Phosphorus Combinations for Sustainable Fire Retarded Polylactide". European Polymer Journal, 218-228 (2016).
Inagaki et al., "Modification of Cellulose Phosphonate with N,N-Dimethylacrylamide and 4-Vinylpyridine, and Flame Retardant Properties of the Products". Journal of Polymer Science: Polymer Chemistry Edition, vol. 16, 2771-2779 (1978).
Nicolas et al., "Phosphorylation of Bio-Based Compounds: the State of the Art". Poly Chem. (2015).

\* cited by examiner

Primary Examiner — Katie L. Hammer
(74) Attorney, Agent, or Firm — Andrus Intellectual Property Law, LLP

(57) ABSTRACT

A method is for manufacturing cellulose microfibers in which a problem of yellowing of cellulose microfibers to be obtained was solved, and cellulose microfibers.
As to a method for manufacturing cellulose microfibers, cellulose fibers are added with an additive (A) consisting of at least one of a phosphorous acid and a metal phosphite and an additive (B) consisting of at least one of urea and a urea derivative, heated and washed, then fibrillated. Also, as to cellulose microfibers, the fiber width is 1 to 1000 nm, and a part of hydroxy groups of cellulose fibers is substituted with a functional group represented by a predetermined structural formula to introduce an ester of phosphorous acid.

13 Claims, No Drawings

CELLULOSE MICROFIBERS AND METHOD FOR MANUFACTURING THE SAME

CROSS-REFERENCE TO RELATED APPLICATIONS

This application is the U.S. national stage application of International Application PCT/JP2018/006617, filed Feb. 23, 2018, which international application was published on Sep. 7, 2018, as International Publication WO2018/159473 in the Japanese language. The International Application claims priority of Japanese Patent Application No. 2017-035663, filed Feb. 28, 2017. The international application and Japanese application are both incorporated herein by reference, in entirety.

TECHNICAL FIELD

The present invention relates to cellulose microfibers and a method for manufacturing the same.

BACKGROUND ART

In recent years, as natural fibers, in addition to cellulose fibers with a fiber diameter of about 20 to 30 µm, there are cellulose microfibers (cellulose nanofibers (CNF)) with a fiber diameter of 1 µm or less. The cellulose microfibers are generally obtained by fibrillating cellulose fibers. At present, various proposals have been made for effectively performing fibrillation of cellulose fibers.

For example, Patent Literature 1 proposes a method of "preparing a polybasic acid half esterified cellulose, prior to fibrillation (microfibrillation), by half-esterifying cellulose with a polybasic acid anhydride to introduce a carboxyl group into a part of hydroxyl groups of cellulose". However, even with the same proposal, it is considered that the cellulose fibers cannot be sufficiently microfabricated by subsequent fibrillation.

Thus, Patent Literature 2 proposes a method of "processing fiber raw materials containing cellulose with at least one compound selected from phosphorus oxoacids or salts thereof while heating to 100 to 170° C.". The proposal assumes that, according to the method, "microfibrous cellulose with a fiber width of 1 to 1000 nm, in which a part of hydroxy groups of cellulose constituting the fiber is substituted with a predetermined functional group to introduce a phosphorus oxoacid group" is obtained. However, according to the findings of the present inventors, the microfibrous cellulose (cellulose microfibers) according to the proposal is yellowish (yellowed). Further, a dispersion of microfibrous cellulose according to the proposal has room for improvement also in terms of transparency and viscosity. Furthermore, the literature states that fiber raw materials containing cellulose (cellulose fiber) are treated with an oxoacid (phosphorus oxoacid) in which a hydroxy group and an oxo group are bonded to a phosphorus atom. However, the literature exemplifies only a compound having a phosphate group as a phosphorus oxoacid or the like, and there is no specific example of other compound. Further, the proposal only raises problems of cost, degree of microfabrication, manufacturing efficiency, stability of dispersion, and environmental load, and does not raise a problem that the obtained microfibrous cellulose is yellowed. Therefore, in consideration of the existence of innumerable phosphorus oxoacids, even a clue to a solution for the problem of yellowing of cellulose microfibers to be obtained is not found from the literature.

CITATION LIST

Patent Literature

Patent Literature 1: JP 2009-293167 A
Patent Literature 2: JP 2013-127141 A

SUMMARY OF INVENTION

Technical Problem

The problem to be solved by the present invention is to provide a method for manufacturing cellulose microfibers in which a problem of yellowing of cellulose microfibers to be obtained was solved, and cellulose microfibers.

Solution to Problem

A means for solving the above problems is
a method for manufacturing cellulose microfibers including:
adding an additive (A) consisting of at least one of a phosphorous acid and a metal phosphite and an additive (B) consisting of at least one of urea and a urea derivative to cellulose fibers, heating and washing, and then fibrillating the cellulose fibers.

Also, a means for solving the above problems is cellulose microfibers, wherein
a fiber width is 1 to 1000 nm, and
a part of hydroxy groups of cellulose fibers is substituted with a functional group represented by the following structural formula (1) to introduce an ester of phosphorous acid.

[Chemical formula 1]

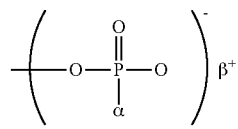

Structural formula (1)

In the structural formula (1), α is any of none, R, and NHR. R is any of a hydrogen atom, a saturated-linear hydrocarbon group, a saturated-branched hydrocarbon group, a saturated-cyclic hydrocarbon group, an unsaturated-linear hydrocarbon group, an unsaturated-branched hydrocarbon group, an aromatic group, and derivative groups thereof. β is a cation consisting of an organic substance or an inorganic substance.

Advantageous Effects of Invention

According to the present invention, there are provided a method for manufacturing cellulose microfibers in which a problem of yellowing of cellulose microfibers to be obtained was solved, and cellulose microfibers.

DESCRIPTION OF EMBODIMENTS

Next, an embodiment of the present invention will be described. The present embodiment is an example of the present invention.

(Cellulose Microfibers)

In the cellulose microfibers of this embodiment, a part of hydroxy groups (—OH groups) of cellulose fibers is substituted with a functional group represented by the following structural formula (1), and an ester of phosphorous acid is introduced (modified) (esterified). Preferably, a part of hydroxy groups of cellulose fibers is substituted with a carbamate group to introduce a carbamate (ester of carbamic acid).

[Chemical formula 1]

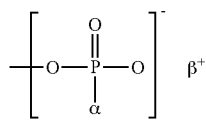

Structural formula (1)

In the structural formula (1), α is any of none, R, and NHR. R is any of a hydrogen atom, a saturated-linear hydrocarbon group, a saturated-branched hydrocarbon group, a saturated-cyclic hydrocarbon group, an unsaturated-linear hydrocarbon group, an unsaturated-branched hydrocarbon group, an aromatic group, and derivative groups thereof. β is a cation consisting of an organic substance or an inorganic substance.

The ester of phosphorous acid is a compound in which a hydroxyl group (hydroxy group) (—OH) and an oxo group (═O) are bonded to a phosphorus atom, and the hydroxyl group gives an acidic proton. Thus, the ester of phosphorous acid has a high negative charge as well as the compound having a phosphate group. Therefore, when the ester of phosphorous acid is introduced, repulsion between cellulose molecules increases, and fibrillation of cellulose fibers is facilitated. Further, when the ester of phosphorous acid is introduced, transparency and viscosity of the dispersion are improved. In particular, when a carbamate is also introduced together with the ester of phosphorous acid, the transparency and viscosity are further improved. In this respect, the carbamate has an amino group. Therefore, when introducing carbamate, cellulose will also have a positive charge. Thus, it is considered that the introduction of carbamate also enhances a charge interaction by the ester of phosphorous acid and carbamate and improves the viscosity. The carbamate is more easily introduced in a case where the ester of phosphorous acid is introduced than a case where the compound having a phosphate group is simultaneously introduced.

Furthermore, in the case where the ester of phosphorous acid is introduced, unlike the case where the compound having a phosphate group is introduced, yellowing of cellulose microfibers to be obtained is prevented. In this respect, the effect of preventing yellowing is not an effect obtained by introducing phosphorus oxoacids in general but an effect obtained only in the case where the ester of phosphorous acid is introduced. Therefore, a concept of phosphorus oxoacid has no meaning from the viewpoint of preventing yellowing. The existence of the yellowing preventing effect in the ester of phosphorous acid was found independently by the present inventors.

In addition, the present inventors consider that yellowing easily occurs in the case where the compound having a phosphate group is introduced because a double bond is easily generated in cellulose by Maillard reaction or reduction reaction. The compound having a phosphate group has higher number of hydrogen than the ester of phosphorous acid, resulting in a lower pH. Then, as the pH is lower, a reaction between amine and sugar is more likely to occur, or the cellulose is more likely to be reduced. Therefore, when it is attempted to introduce a compound having a phosphate group, the cellulose is likely to be decomposed at the time of heating to form sugar, or the cellulose is likely to be reduced. As a result, yellowing is more likely to occur when the compound having a phosphate group is introduced.

The amount of ester of phosphorous acid introduced is preferably 0.06 to 3.39 mmol, more preferably 0.61 to 1.75 mmol, and particularly preferably 0.95 to 1.42 mmol, per 1 g of the cellulose microfibers. When the amount introduced is less than 0.06 mmol, fibrillation of cellulose fibers may not be facilitated. In addition, an aqueous dispersion of cellulose microfibers may be unstable. On the other hand, when the amount introduced exceeds 3.39 mmol, the cellulose fibers may be dissolved in water.

The amount of ester of phosphorous acid introduced is a value evaluated based on elemental analysis. X-Max 50 001 manufactured by HORIBA, Ltd. is used for this elemental analysis.

The degree of substitution (DS) of the functional group represented by the structural formula (1) is preferably 0.01 to 0.55, more preferably 0.10 to 0.28, and particularly preferably 0.15 to 0.23. When the degree of substitution is less than 0.01, fibrillation of cellulose fibers may not be facilitated. On the other hand, when the degree of substitution exceeds 0.55, the cellulose fibers may be yellowed.

The degree of substitution of the carbamate group is preferably 0.01 to 0.50, more preferably 0.05 to 0.45, and particularly preferably 0.10 to 0.40. When the degree of substitution is less than 0.01, the transparency and viscosity may not be sufficiently increased. On the other hand, when the degree of substitution exceeds 0.50, the cellulose fibers may be yellowed.

Here, the degree of substitution refers to an average number of substitutions of a functional group (a functional group represented by the structural formula (1) or a carbamate group) with respect to one glucose unit in cellulose. The degree of substitution can be controlled, for example, by reaction temperature or reaction time. The higher the reaction temperature or the longer the reaction time, the more the degree of substitution increases. However, when the degree of substitution increases too much, the degree of polymerization of cellulose is significantly reduced.

The fiber width (average diameter of single fibers) of the cellulose microfibers is preferably 1 to 1000 nm, more preferably 2 to 400 nm, and particularly preferably 3 to 100 nm. When the fiber width is less than 1 nm, cellulose may be dissolved in water and may not have physical properties, for example, strength, rigidity, dimensional stability, and the like, as cellulose microfibers. On the other hand, when the fiber width exceeds 1000 nm, it can no longer be said to be a cellulose microfiber, and is a normal cellulose fiber.

The fiber width of cellulose microfibers is measured using an electron microscope as follows.

First, 100 ml of an aqueous dispersion of cellulose microfibers having a solid content concentration of 0.01 to 0.1% by mass is filtered through a membrane filter made of Teflon (registered trademark), and solvent substitution is performed once with 100 ml of ethanol and 3 times with 20 ml of t-butanol. Next, it is lyophilized and osmium coated to obtain a sample. This sample is observed with an electron microscope SEM image at a magnification of either 5000, 10,000 or 30,000 depending on the width of the fibers to be constituted. In this observation, two diagonals are drawn in the observation image, and further, three straight lines passing an intersection of the diagonals are arbitrarily drawn. Then, the width of a total of 100 fibers intersecting with the three straight lines is measured visually. A median diameter of these measurement values is taken as the fiber width.

The axial ratio (fiber length/fiber width) of the cellulose microfibers is preferably 3 to 1,000,000, more preferably 6 to 340,000, and particularly preferably 10 to 340,000. When the axial ratio is less than 3, it is no longer fibrous. On the other hand, when the axial ratio exceeds 1,000,000, the viscosity of the dispersion (slurry) may be too high.

The degree of crystallinity of the cellulose microfibers is preferably 50 to 100%, more preferably 60 to 90%, and particularly preferably 65 to 85%. When the degree of crystallinity is less than 50%, strength and heat resistance may be considered to be insufficient. The degree of crystallinity can be adjusted, for example, by selection of pulp fibers, pretreatment, fibrillation, and the like. The degree of crystallinity is a value measured by X-ray diffraction method in accordance with "general rules for X-ray diffraction analysis" in JIS-K0131 (1996). In addition, the cellulose microfiber has an amorphous portion and a crystalline portion, and the degree of crystallinity means a ratio of the crystalline portion in the whole cellulose microfiber.

The light transmittance (solution with a solid content of 0.2%) of the cellulose microfibers is preferably 40.0% or more, more preferably 60.0% or more, and particularly preferably 70.0%. When the light transmittance is less than 40.0%, transparency may be considered to be insufficient. The light transmittance of the cellulose microfibers can be adjusted, for example, by selection of pulp fibers, pretreatment, fibrillation, and the like.

The light transmittance is a value obtained by measuring the transparency (transmittance of 350 to 880 nm light) of a 0.2% (w/v) cellulose microfiber dispersion using Spectrophotometer U-2910 (Hitachi, Ltd.).

The B-type viscosity of the dispersion when the concentration of cellulose microfibers is 1% by mass (w/w) is preferably 10 to 300,000 cps, more preferably 1,000 to 200,000 cps, and particularly preferably 10,000 to 100,000 cps. The B-type viscosity is a value measured on an aqueous dispersion of cellulose microfibers with a solid content concentration of 1%, in accordance with "methods for viscosity measurement of liquid" in JIS-Z8803 (2011). The B-type viscosity is a resistance torque when a slurry is stirred, and it means that, the higher it is, the higher the energy required for the stirring.

(Method for Manufacturing Cellulose Microfibers)

In a method for manufacturing cellulose microfibers of this embodiment, an additive (A) consisting of at least one of a phosphorous acid and a metal phosphite and an additive (B) consisting of at least one of urea and a urea derivative are added to cellulose fibers, and heated to introduce an ester of phosphorous acid and preferably an ester of phosphorous acid and a carbamate into the cellulose fibers. In addition, the cellulose fibers into which the ester of phosphorous acid or the like is introduced are washed, and then fibrillated to obtain cellulose microfibers.

(Cellulose Fibers)

As cellulose fibers, for example, plant-derived fibers (plant fibers), animal-derived fibers, microorganism-derived fibers and the like can be used. These fibers can be used alone or in combination of two or more as needed. However, it is preferable to use plant fibers as cellulose fibers, and it is more preferable to use pulp fibers which are a type of plant fibers. When the cellulose fibers are pulp fibers, it is easy to adjust physical properties of the cellulose microfibers.

As plant fibers, for example, wood pulps made from hardwood and softwood trees and the like, non-wood pulp made from straw, bagasse and the like, waste paper pulp (DIP) made from recycled waste paper, broken paper and the like, and the like can be used. These fibers can be used alone or in combination of two or more.

As wood pulps, for example, chemical pulps such as hardwood kraft pulps (LKP) and softwood kraft pulps (NKP), mechanical pulps (TMP), waste paper pulps (DIP) and the like can be used. These pulps can be used alone or in combination of two or more.

The hardwood kraft pulp (LKP) may be a hardwood bleached kraft pulp, a hardwood unbleached kraft pulp, or a hardwood semi-bleached kraft pulp. The softwood kraft pulp (NKP) may be a softwood bleached kraft pulp, a softwood unbleached kraft pulp, or softwood semi-bleached kraft pulp. The waste paper pulp (DIP) may be a magazine waste paper pulp (MDIP), a newspaper waste paper pulp (NDIP), a recycled waste paper pulp (WP), or other waste paper pulp.

(Additive (A))

The additive (A) consists of at least one of a phosphorous acid and a metal phosphite. As the additive (A), for example, a phosphorous acid, phosphite compounds such as sodium hydrogen phosphite, ammonium hydrogen phosphite, potassium hydrogen phosphite, sodium dihydrogen phosphite, sodium phosphite, lithium phosphite, potassium phosphite, magnesium phosphite, calcium phosphite, triethyl phosphite, triphenyl phosphite and pyrophosphorous acid, and the like can be used. These phosphorous acids or metal phosphites each can be used alone or in combination of two or more. However, it is preferred to use sodium hydrogen phosphite.

In adding the additive (A), the cellulose fibers may be in a dry state, a wet state, or a slurry state. Also, the additive (A) may be in the form of powder or in the form of an aqueous solution. However, it is preferable to add the additive (A) in the form of an aqueous solution to the cellulose fibers in a dry state because uniformity of reaction is high.

The amount of additive (A) added is preferably 1 to 10,000 g, more preferably 100 to 5,000 g, and particularly preferably 300 to 1,500 g, based on 1 kg of the cellulose fibers. When the amount added is less than 1 g, an effect of the addition of additive (A) may not be obtained. On the other hand, even when the amount added exceeds 10,000 g, the effect of the addition of additive (A) may be flat.

(Additive (B))

The additive (B) consists of at least one of urea and a urea derivative. As the additive (B), for example, urea, thiourea, biuret, phenylurea, benzylurea, dimethylurea, diethylurea, tetramethylurea and the like can be used. These urea or urea derivatives each can be used alone or in combination of two or more. However, it is preferred to use urea.

When heated, the additive (B) is decomposed into isocyanic acid and ammonia as shown in the following reaction formula (1). Moreover, isocyanic acid is very reactive, and forms a hydroxyl group of cellulose and a carbamate as shown in the following reaction formula (2).

  (1)

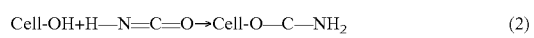  (2)

The amount of additive (B) added is preferably 0.01 to 100 mol, more preferably 0.2 to 20 mol, and particularly preferably 0.5 to 10 mol, based on 1 mol of the additive (A). When the amount added is less than 0.01 mol, the ester of phosphorous acid may not be sufficiently introduced into the cellulose fibers. On the other hand, even when the amount added exceeds 100 mol, an effect of the addition of urea may be flat.

(Heating)

The heating temperature when heating the cellulose fibers to which the additive (A) and the additive (B) are added is preferably 100 to 210° C., more preferably 100 to 200° C., and particularly preferably 100 to 180° C. When the heating temperature is 100° C. or more, the ester of phosphorous acid can be introduced. However, when the heating temperature exceeds 210° C., deterioration of cellulose rapidly progresses, which may cause coloring and viscosity reduction.

The pH when heating the cellulose fibers to which the additive (A) and the additive (B) are added is preferably 3 to 12, more preferably 4 to 11, and particularly preferably 6 to 9. The lower the pH, the easier the ester of phosphorous acid and a carbamate are introduced. However, when the pH is less than 3, deterioration of cellulose may proceed rapidly.

Heating of the cellulose fibers to which the additive (A) and the additive (B) are added is preferably performed until the cellulose fibers are dried. Specifically, drying is performed until the moisture content of the cellulose fibers is preferably 10% or less, more preferably 0.1% or less, and particularly preferably 0.001% or less. Of course, the cellulose fibers may be in an absolutely dry state without water.

The heating time of the cellulose fibers to which the additive (A) and the additive (B) are added is, for example, 1 to 1,440 minutes, preferably 10 to 180 minutes, and more preferably 30 to 120 minutes. When the heating time is too long, the introduction of ester of phosphorous acid or carbamate may proceed too much. In addition, when the heating time is too long, the cellulose fibers may be yellowed.

As an apparatus which heats the cellulose fibers to which the additive (A) and the additive (B) are added, a hot-air dryer, a paper machine, a dry pulp machine or the like can be used, for example.

(Pretreatment)

Prior to the introduction of the ester of phosphorous acid or the like and/or after the introduction of the ester of phosphorous acid or the like into the cellulose fibers, the cellulose fibers can be subjected to pretreatment such as beating, as needed. By pretreating the pulp fibers prior to fibrillation of cellulose fibers, the number of fibrillation can be significantly reduced, and fibrillation energy can be reduced.

Pretreatment of the cellulose fibers can be performed by a physical or chemical method, and preferably a physical method and a chemical method. The pretreatment by a physical method and the pretreatment by a chemical method may be performed simultaneously or separately.

It is preferable to adopt beating as the pretreatment by a physical method. When the cellulose fibers are beaten, the cellulose fibers are cut and aligned. Therefore, entanglement of cellulose fibers is prevented (agglomeration prevention). From this viewpoint, the beating is preferably performed until freeness of the cellulose fibers is 700 ml or less, more preferably 500 ml or less, and particularly preferably 300 ml or less. The freeness of the cellulose fibers is a value measured in accordance with JIS P8121-2 (2012). Further, the beating can be performed using, for example, a refiner, a beater or the like.

Examples of the pretreatment by a chemical method can include hydrolysis of polysaccharides with acid (acid treatment), hydrolysis of polysaccharides with enzyme (enzyme treatment), swelling of polysaccharides with alkali (alkali treatment), oxidation of polysaccharides with an oxidizing agent (oxidation treatment), reduction of polysaccharides with a reducing agent (reduction treatment), and the like. However, as the pretreatment by a chemical method, it is preferable to apply enzyme treatment, and it is more preferable to additionally apply one or more treatments selected from acid treatment, alkali treatment, and oxidation treatment. Hereinafter, the enzyme treatment and the alkali treatment will be described in order.

As the enzyme used for the enzyme treatment, it is preferable to use at least one of a cellulase enzyme and a hemicellulase enzyme, and it is more preferable to use both in combination. The use of these enzymes facilitates the fibrillation of cellulose fibers. Here, the cellulase enzymes cause decomposition of cellulose in the presence of water. In addition, the hemicellulase enzymes cause decomposition of hemicellulose in the presence of water.

As the cellulase enzyme, for example, enzymes produced by the genus *Trichoderma* (filamentous fungus), the genus *Acremonium* (filamentous fungus), the genus *Aspergillus* (filamentous fungus), the genus *Phanerochaete* (basidiomycete), the genus *Trametes* (basidiomycete), the genus *Humicola* (filamentous fungus), the genus *Bacillus* (bacteria), the genus *Schizophyllum* (bacteria), the genus *Streptomyces* (bacteria), the genus *Pseudomonas* (bacteria), and the like can be used. These cellulase enzymes can be purchased as reagents or commercial products. Examples of the commercial products can include cell leucine T2 (manufactured by HBI Enzymes Inc.), Meicelase (manufactured by Meiji Seika Pharma Co., Ltd.), Novozyme 188 (manufactured by Novozymes), Multifect CX10L (manufactured by Genencor), cellulase enzyme GC220 (manufactured by Genencor), and the like.

Moreover, as the cellulase enzyme, either EG (endoglucanase) and CBH (cellobiohydrolase) can also be used. EG and CBH may be used alone or in mixture. Moreover, EG and CBH may be used in mixture with a hemicellulase enzyme.

As the hemicellulase enzyme, for example, xylanase which is an enzyme degrading xylan, mannase which is an enzyme degrading mannan, arabanase which is an enzyme degrading araban and the like can be used. Also, pectinase which is an enzyme degrading pectin can also be used.

Hemicellulose is a polysaccharide from which pectins between cellulose microfibrils of plant cell walls are removed. Hemicellulose is diverse and varies with the type of wood and cell wall layers. On a secondary wall of softwood, glucomannan is a main component, and on a secondary wall of hardwood, 4-O-methylglucuronoxylan is a main component. Therefore, when obtaining cellulose microfibers from softwood bleached kraft pulp (NBKP), it is preferable to use mannase. Moreover, when obtaining cellulose microfibers from hardwood bleached kraft pulp (LBKP), it is preferable to use xylanase.

The amount of enzyme added to the cellulose fibers is determined, for example, by the type of enzyme, the type of wood (softwoods or hardwoods) used as the raw material, the type of mechanical pulp, or the like. However, the amount of enzyme added to the cellulose fibers is preferably 0.1 to 3% by mass, more preferably 0.3 to 2.5% by mass, and particularly preferably 0.5 to 2% by mass. When the amount of enzyme added is less than 0.1% by mass, an effect of the addition of enzyme may not be sufficiently obtained. On the other hand, when the amount of enzyme added exceeds 3% by mass, cellulose is saccharified, and the yield of cellulose microfibers may be reduced. In addition, there is also a problem that an improvement in an effect corresponding to an increase in the amount added cannot be recognized.

When using a cellulase enzyme as the enzyme, the pH at the time of enzyme treatment is preferably in a weakly acidic region (pH=3.0 to 6.9) from the viewpoint of reactivity of an enzyme reaction. On the other hand, when using a hemicellulase enzyme as the enzyme, the pH at the time of enzyme treatment is preferably in a weakly alkaline region (pH=7.1 to 10.0).

The temperature at the time of enzyme treatment is preferably 30 to 70° C., more preferably 35 to 65° C., and particularly preferably 40 to 60° C., also when using either a cellulase enzyme or a hemicellulase enzyme as the enzyme. When the temperature at the time of enzyme treatment is 30° C. or more, the enzyme activity is less likely to deteriorate, and the treatment time can be prevented from being prolonged. On the other hand, when the temperature at the time of enzyme treatment is 70° C. or less, inactivation of the enzyme can be prevented.

The time of enzyme treatment is determined, for example, by the type of enzyme, the temperature of enzyme treatment, the pH at the time of enzyme treatment, and the like. However, the time of general enzyme treatment is 0.5 to 24 hours.

After enzyme treatment, it is preferred to inactivate the enzyme. As a method for inactivating the enzyme, there are, for example, a method of adding an alkaline aqueous solution (preferably pH 10 or more, more preferably pH 11 or more), a method of adding 80 to 100° C. hot water, and the like.

Next, the method of the above-mentioned alkali treatment will be described.

As a method of alkali treatment, for example, there is a method of immersing cellulose fibers into which an ester of phosphorous acid or the like is introduced in an alkali solution.

An alkali compound contained in the alkali solution may be an inorganic alkali compound or an organic alkali compound. Examples of the inorganic alkali compound can include hydroxides of an alkali metal or an alkaline earth metal, carbonates of an alkali metal or an alkaline earth metal, phosphates of an alkali metal or an alkaline earth metal, and the like. Moreover, examples of the hydroxide of an alkali metal can include lithium hydroxide, sodium hydroxide, potassium hydroxide, and the like. Examples of the hydroxide of an alkaline earth metal can include calcium hydroxide and the like. Examples of the carbonate of an alkali metal can include lithium carbonate, lithium hydrogen carbonate, potassium carbonate, potassium hydrogen carbonate, sodium carbonate, sodium hydrogen carbonate, and the like. Examples of the carbonate of an alkaline earth metal can include calcium carbonate and the like. Examples of the phosphate of an alkali metal can include lithium phosphate, potassium phosphate, trisodium phosphate, disodium hydrogen phosphate, and the like. Examples of the phosphate of an alkaline earth metal can include calcium phosphate, calcium hydrogen phosphate, and the like.

Examples of the organic alkali compound can include ammonia, aliphatic amines, aromatic amines, aliphatic ammonium, aromatic ammonium, heterocyclic compounds and hydroxides, carbonates and phosphates thereof, and the like. Specific examples can include, for example, ammonia, hydrazine, methylamine, ethylamine, diethylamine, triethylamine, propylamine, dipropylamine, butylamine, diaminoethane, diaminopropane, diaminobutane, diaminopentane, diaminohexane, cyclohexylamine, aniline, tetramethylammonium hydroxide, tetraethylammonium hydroxide, tetrapropylammonium hydroxide, tetrabutylammonium hydroxide, benzyltrimethylammonium hydroxide, pyridine, N,N-dimethyl-4-aminopyridine, ammonium carbonate, ammonium hydrogen carbonate, diammonium hydrogen phosphate, and the like.

The solvent of the alkali solution may be either water or an organic solvent, but is preferably a polar solvent (water or a polar organic solvent such as alcohol), and more preferably an aqueous solvent containing at least water.

The pH of the alkali solution at 25° C. is preferably 9 or more, more preferably 10 or more, and particularly preferably 11 to 14. When the pH is 9 or more, the yield of cellulose microfibers is increased. However, when the pH exceeds 14, handleability of the alkali solution is deteriorated.

(Washing)

The cellulose fibers into which the ester of phosphorous acid or the like is introduced are washed prior to fibrillation. By cleaning the cellulose fibers, byproducts and unreacted substances can be washed away. In addition, when this cleaning precedes the alkali treatment in the pretreatment, the amount of alkali solution used in the alkali treatment can be reduced.

The washing of the cellulose fibers can be performed using, for example, water, an organic solvent or the like.

(Fibrillation)

The cellulose fibers into which the ester of phosphorous acid or the like is introduced are fibrillated (microfabricated) after washing. By this fibrillation, pulp fibers are microfibrillated to be cellulose microfibers (cellulose nanofibers).

In order to fibrillate the cellulose fibers, it is preferable to make the cellulose fibers in a slurry form. The solid content concentration of the slurry is preferably 0.1 to 20% by mass, more preferably 0.5 to 10% by mass, and particularly preferably 1.0 to 5.0% by mass. When the solid content concentration is within the above range, it can be efficiently fibrillated.

The fibrillation of cellulose fibers can be performed, for example, by selectively using one or two or more means from among homogenizers such as high-pressure homogenizers and high-pressure homogenizing apparatuses, high-speed rotary homogenizers, stone mill-type friction machines such as grinders and mills, refiners such as conical refiners and disc refiners, uniaxial kneaders, multiaxial kneaders, various bacteria, and the like. However, it is preferable to perform the fibrillation of cellulose fibers using an apparatus and method for microfabricating with a water stream, particularly a high pressure water stream. According to this apparatus and method, dimensional uniformity and dispersion uniformity of the cellulose microfibers to be obtained become very high. On the other hand, for example, when using a grinder that grinds between rotating grindstones, it is difficult to uniformly microfabricate the cellulose fibers, and in some cases, a fiber lump that cannot be partially frayed may remain.

As the grinder used for the fibrillation of cellulose fibers, there is, for example, Masukoroider manufactured by Masuko Sangyo Co., Ltd., and the like. Moreover, as the apparatus for microfabricating with a high pressure water stream, there are, for example, Starburst (registered trademark) manufactured by Sugino Machine Limited, Nanovater (registered trademark) manufactured by YOSHIDA KIKAI CO., LTD., and the like. In addition, as the high-speed rotary homogenizer used for the fibrillation of cellulose fibers, there are Cleamix-11S manufactured by M Technique Co., Ltd., and the like.

Here, the present inventors have found that when cellulose fibers are fibrillated by a method of grinding between rotating grindstones and a method of microfabricating with a high pressure water stream, respectively, and each obtained fiber is microscopically observed, the fibers obtained by microfabricating with a high pressure water stream have more uniform fiber width.

It is preferable that the fibrillation with a high pressure water stream is performed by pressurizing a dispersion of cellulose fibers to, for example, 30 MPa or more, preferably 100 MPa or more, more preferably 150 MPa or more, and particularly preferably 220 MPa or more (high pressure condition) to jet from a nozzle with a pore diameter 50 μm or more, by a method to reduce pressure (pressure reduction condition) so that the pressure difference is, for example, 30 MPa or more, preferably 80 MPa or more, and more preferably 90 MPa or more. Pulp fibers are fibrillated by a cleavage phenomenon caused by this pressure difference. When the pressure under the high pressure condition is low or when the pressure difference from the high pressure condition to the pressure reduction condition is small, fibrillation efficiency is lowered, and it is necessary to repeatedly fibrillate (jet from the nozzle) to obtain a desired fiber diameter.

It is preferable to use a high-pressure homogenizer as the apparatus for fibrillating with a high pressure water stream. The high-pressure homogenizer refers to, for example, a homogenizer having an ability to jet a cellulose fiber slurry at a pressure of 10 MPa or more, and preferably 100 MPa or more. When the cellulose fibers are treated with a high-pressure homogenizer, collisions between cellulose fibers, pressure difference, microcavitation and the like act to effectively fibrillate the cellulose fibers. Therefore, the number of times of fibrillation treatment can be reduced, and the manufacturing efficiency of cellulose microfibers can be enhanced.

As the high-pressure homogenizer, it is preferable to use one which allows the cellulose fiber slurry to countercurrently collide in a straight line. Specific examples include a counter-collision high-pressure homogenizer (MICROFLUIDIZER (registered trademark), wet jet mill). In this apparatus, two upstream flow passages are formed so that streams of the pressurized cellulose fiber slurry countercurrently collide at a merging part. Further, the streams of the cellulose fiber slurry collide at the merging part, and the collided cellulose fiber slurry flows out from a downstream flow passage. The downstream flow passage is provided vertically to the upstream flow passages, and a T-shaped flow passage is formed by the upstream flow passages and the downstream flow passage. By using such a counter-collision high-pressure homogenizer, an energy given from the high-pressure homogenizer can be maximally converted into collision energy, so that cellulose fibers can be fibrillated more efficiently.

The fibrillation of cellulose fibers is preferably performed so that the average fiber width, average fiber length, water retention, degree of crystallinity, peak value of pseudo particle size distribution, and pulp viscosity of the cellulose microfibers to be obtained are the above-described desired values or evaluations.

EXAMPLES

Next, examples of the present invention will be described.

A phosphorus oxoacid (sodium hydrogen phosphate or sodium hydrogen phosphite) and urea were added to the cellulose fibers, and after heating and washing, the cellulose fibers were fibrillated, and thus performing a test of manufacturing cellulose microfibers. Softwood bleached kraft pulp was used as the cellulose fibers. In addition, fibrillation was performed using a high-pressure homogenizer. Further, the beating was performed on the phosphorous-modified pulp at 9,200 revolutions using a PFI mill.

The addition amounts of phosphorus oxoacid and urea, the heating temperature and time were as shown in Table 1. The physical properties and evaluations of the obtained cellulose microfibers are shown in Table 2. The evaluation methods of the B-type viscosity and permeability were as described above. Moreover, yellowing shall be determined by visual observation, and was evaluated on the following criteria.

(Yellowing)
◉: Cellulose microfibers become transparent or white
○: Cellulose microfibers become ivory
Δ: Cellulose microfibers become light yellow
x: Cellulose microfibers clearly become yellow

TABLE 1

|  | Addition Amount | | Heating | | | Fibrillation |
| --- | --- | --- | --- | --- | --- | --- |
|  | Phosphorus oxoacid kg/PT | Urea kg/PT | Temperature ° C. | Time Minute | Beating — | Number of Passes |
| Test Example 1 | 940 | 1080 | 150 | 120 | None | 1 |
| Test Example 2 | 940 | 3600 | 150 | 120 | None | 1 |
| Test Example 3 | 1500 | 60 | 150 | 120 | None | 1 |
| Test Example 4 | 1500 | 360 | 150 | 120 | None | 1 |
| Test Example 5 | 1500 | 1080 | 150 | 120 | None | 1 |
| Test Example 6 | 1500 | 3600 | 150 | 120 | None | 1 |
| Test Example 7 | 1500 | 1080 | 170 | 5 | None | 1 |
| Test Example 8 | 1500 | 1080 | 180 | 5 | None | 1 |
| Test Example 9 | 1500 | 1080 | 180 | 10 | None | 1 |
| Test Example 10 | 1500 | 1080 | 180 | 60 | None | 1 |
| Test Example 11 | 1500 | 1080 | 150 | 120 | Yes | 1 |
| Test Example 12 | 1500 | 1080 | 150 | 120 | Yes | 2 |

TABLE 2

|  | Introduction (modification) | Phosphorus oxo group Substitution rate DS | Carbamate group Substitution rate DS | B-type viscosity CP | Permeability % | Yellowing Sensory test |
|---|---|---|---|---|---|---|
| Test Example 1 | Phosphate | 0.55 | 0.13 | 17300 | 41.9 | x |
| Test Example 2 | Phosphate | 0.53 | — | 10700 | 40.6 | △ |
| Test Example 3 | Phosphite | 0.05 | — | 4,000 | 40.0 | ⊙ |
| Test Example 4 | Phosphite | 0.10 | — | 6,000 | 45.0 | ⊙ |
| Test Example 5 | Phosphite | 0.20 | — | 18800 | 56.2 | ⊙ |
| Test Example 6 | Phosphite | 0.23 | 0.14 | 12000 | 65.7 | ⊙ |
| Test Example 7 | Phosphite | 0.13 | — | 9400 | 41.5 | ⊙ |
| Test Example 8 | Phosphite | 0.15 | — | 15600 | 44.6 | ⊙ |
| Test Example 9 | Phosphite | 0.15 | — | 16400 | 44.6 | ⊙ |
| Test Example 10 | Phosphite | 0.24 | — | 29300 | 56.1 | ○ |
| Test Example 11 | Phosphite | 0.20 | — | 32100 | 71.7 | ⊙ |
| Test Example 12 | Phosphite | 0.20 | — | 43900 | 91.9 | ⊙ |

INDUSTRIAL APPLICABILITY

The present invention can be used as cellulose microfibers and a method for manufacturing the same.

The invention claimed is:

1. A method for manufacturing cellulose microfibers comprising:
   providing cellulose fibers having a plurality of hydroxy groups,
   adding an additive (A) consisting of at least one of a phosphorous acid and a metal phosphite and an additive (B) consisting of at least one of urea and a urea derivative to the cellulose fibers;
   heating and washing the cellulose fibers to which the additive (A) and the additive (B) have been added such that an ester of phosphorous acid is introduced; and
   fibrillating the cellulose fibers;
   wherein the heating is performed until a degree of substitution of the plurality of hydroxy groups in the cellulose fibers ranges from 0.01 to 0.55, wherein the degree of substitution is an average number of substitutions of the plurality of hydroxy groups with respect to one glucose unit in the cellulose fibers.

2. The method for manufacturing cellulose microfibers according to claim 1, wherein the heating is performed until the moisture content is 10% or less.

3. The method for manufacturing cellulose microfibers according to claim 1, wherein the addition amount of the additive (A) is 1 to 10,000 g based on 1 kg of the cellulose fibers, and the addition amount of the additive (B) is 0.01 to 100 mol based on 1 mol of the additive (A).

4. The method for manufacturing cellulose microfibers according to claim 1, wherein the heating is performed at 100 to 210° C.

5. The method for manufacturing cellulose microfibers according to claim 1, wherein the heating is performed at a pH of 3 to 12.

6. Cellulose microfibers, wherein a fiber width is 1 to 1000 nm, and a part of a plurality of hydroxy groups of cellulose fibers is substituted with a functional group represented by the following structural formula (1) to introduce an ester of phosphorous acid:

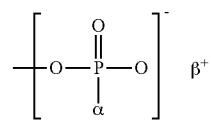

Structural formula (1)

where α is any of none, R, and NHR, R is any of a hydrogen atom, a saturated-linear hydrocarbon group, a saturated-branched hydrocarbon group, a saturated-cyclic hydrocarbon group, an unsaturated-linear hydrocarbon group, an unsaturated-branched hydrocarbon group, an aromatic group, and derivative groups thereof, and β is a cation consisting of an organic substance or an inorganic substance; and wherein a degree of substitution of the plurality of hydroxy groups in the cellulose fibers by the functional group represented by the structural formula (1) ranges from 0.01 to 0.55, wherein the degree of substitution is an average number of substitutions of the functional group represented by the structural formula (1) with respect to one glucose unit in the cellulose fibers.

7. The cellulose microfibers according to claim 6, wherein a part of hydroxy groups of cellulose fibers is substituted with a carbamate group to introduce a carbamate.

8. The method for manufacturing cellulose microfibers according to claim 2, wherein the addition amount of the additive (A) is 1 to 10,000 g based on 1 kg of the cellulose fibers, and the addition amount of the additive (B) is 0.01 to 100 mol based on 1 mol of the additive (A).

9. The method for manufacturing cellulose microfibers according to claim 2, wherein the heating is performed at 100 to 210° C.

10. The method for manufacturing cellulose microfibers according to claim 3, wherein the heating is performed at 100 to 210° C.

11. The method for manufacturing cellulose microfibers according to claim 2, wherein the heating is performed at a pH of 3 to 12.

12. The method for manufacturing cellulose microfibers according to claim 3, wherein the heating is performed at a pH of 3 to 12.

13. The method for manufacturing cellulose microfibers according to claim 4, wherein the heating is performed at a pH of 3 to 12.

* * * * *